June 27, 1950 C. W. EARP 2,512,614
FREQUENCY CHANGING CIRCUITS PARTICULARLY FOR THE RECEPTION OF ULTRA-SHORT ELECTROMAGNETIC WAVES
Filed April 5, 1947
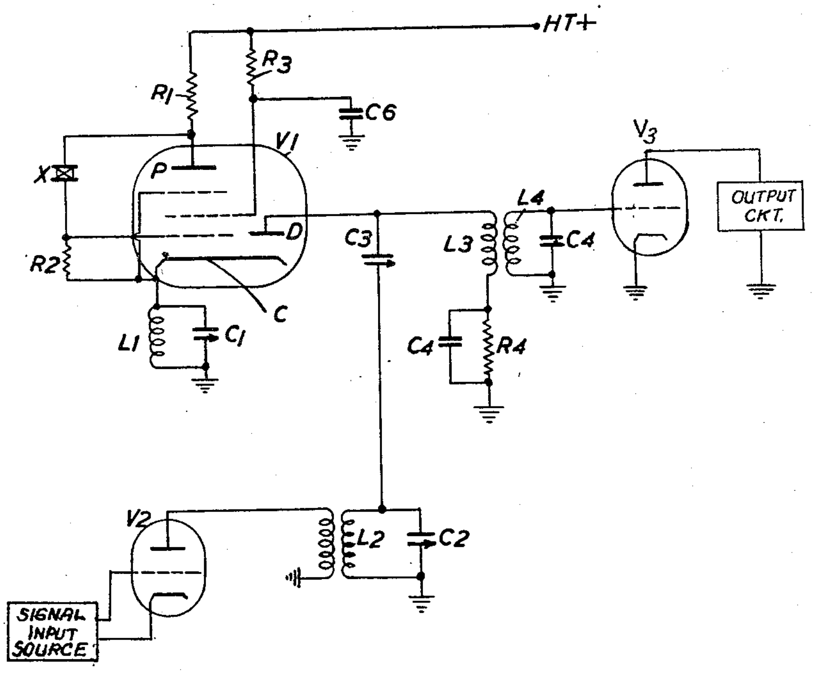
Inventor
Charles William Earp
By
E. W. Plummer
Attorney Patented June 27, 1950

2,512,614

UNITED STATES PATENT OFFICE 2,512,614

FREQUENCY CHANGING CIRCUITS PARTICULARLY FOR THE RECEPTION OF ULTRA-SHORT ELECTROMAGNETIC WAVES

Charles William Earp, London, England, assignor to International Standard Electric Corporation, New York, N. Y., a corporation of Delaware Application April 5, 1947, Serial No. 739,609
In Great Britain April 30, 1940

Section 1, Public Law 690, August 8, 1946, Patent expires April 30, 1960

9 Claims. (Cl. 332—52)

This invention relates to frequency changing systems particularly for the reception of ultra-short electromagnetic waves.

An object of the invention is the provision of a frequency changing system which is highly efficient and economical in component apparatus and valves, and which provides a high degree of gain stability in spite of power supply variations and of variations in crystal activity, if a piezo-electric crystal is employed for frequency control of the local oscillations.

According to the invention, a frequency changing system comprises a diode valve and a valve having a cathode, an anode and at least one intermediate grid electrode, the last-mentioned valve being arranged as an oscillator and the cathodes of both valves being connected to a point of constant potential over a common connection including an oscillatory circuit tuned to the frequency of oscillation or a harmonic thereof, and the signal input circuit and the intermediate frequency output circuit being connected to the anode of the diode.

According to a further feature of the invention a frequency changing system comprises a valve having an oscillator portion and a detector portion associated with a common cathode, the oscillator portion comprising the cathode, an anode and at least one grid electrode and the detector portion comprising the cathode and a diode anode, a circuit tuned to the frequency at which the oscillator portion is adapted to oscillate, or a harmonic thereof, being connected between the cathode and a point of constant potential, and a signal input circuit and an intermediate frequency output circuit being connected to the diode anode.

These and other features of the invention set out in the appended claims will be better understood from the following detailed description and the accompanying drawing which illustrates one method of carrying out the invention.

Referring to the drawing, a diode D and a pentode P operating from a common cathode C are contained within the same envelope V1.

The pentode portion P of the valve V1 is caused to oscillate at, say, 8 megacycles by connection of the crystal X between the control grid and the anode. H.T. is fed to the anode over resistance R1 and a resistance R2 provides a return path from the control grid to the cathode. The suppressor-grid is connected directly to the cathode inside the envelope, but could alternatively be connected to ground. The second grid (or normal screening grid) is supplied with potential from the high tension supply via resistance R3, and the bypass condenser C6 short circuits to ground, any high frequency potential which might otherwise be developed.

The high frequency signal (of frequency say 35 megacycles), which may be derived from an aerial, or as shown from a high frequency amplifying valve V2 is tuned to resonance in the circuit L2—C2, and the potential obtained is passed to the anode of the diode D via condenser C3. The inductance L3 serves as a signal frequency choke, and the resistance R4 and bypass condenser C4 serve to provide the necessary bias voltage for the diode D, this bias voltage being developed by rectification of oscillator voltage supplied to it at the cathode C.

The tuned circuit L1—C1 in the cathode lead selects the second harmonic of the crystal frequency, at 16 megacycles, and delivers this potential to the diode by virtue of its direct connection to the diode portion of the cathode. Rectification by the diode provides an adequate harmonic at 32 megacycles to serve as the source of high frequency oscillations for the frequency changer.

Intermediate frequency (3 megacycles) currents appear in inductance L3, which serves not only as a high frequency choke as previously described, but as the inductance of an efficient circuit tuned to 3 megacycles. C3 is the tuning condenser which returns to earth via the signal circuit L2—C2 which has a negligible impedance at 3 megacycles. Similarly, L3 has a very high reactance at 35 megacycles, so that interaction in tuning between condensers C2 and C3 is negligible.

A further intermediate frequency tuned circuit, composed of inductance L4 and condenser C5, and tuned to 3 megacycles, is coupled to L3, and passes the intermediate frequency potential to the intermediate frequency amplifying valve V3.

It is not necessary, of course, that the pentode P and the diode D should be in the same envelope provided that their cathodes are connected to a point of constant potential over a common connection including the tuned circuit L1—C1. Moreover, a triode or tetrode may be employed for the oscillator portion instead of a pentode.

This arrangement described is highly efficient, economical in components and valves, and provides a high degree of gain stability with power supply variations, and variation in crystal activity. With the latter object in view, it is desirable that the harmonic (16 megacycles) developed in the circuit L1—C1 should be several times greater in amplitude than is necessary for efficient frequency-changing, so that a reduced amplitude caused by a change in crystal activity will produce no change in conversion factor. In practice, a good gain stability is obtained from such excitation that 8 to 10 volts D. C. are produced across the resistance R4.

I claim:

1. A frequency changing system for a signal input circuit comprising a diode valve having a cathode and plate electrode, a second valve having a cathode and an anode and at least one intermediate grid electrode, means for sustaining oscillations in said second valve at a given frequency, means for connecting the cathodes of both valves to a point of constant potential comprising a common connection including an oscillatory circuit tuned to a harmonic of the frequency of oscillations, an intermediate frequency output circuit, and means for coupling said signal input circuit and the intermediate frequency output circuit to the anode of the diode valve.

2. A frequency changing system having a source of input signals comprising a valve having an oscillator portion and a detector portion associated with a common cathode electrode said oscillator portion comprising said cathode, an anode and at least one grid electrode, and said detector portion comprising said cathode and a diode anode, a circuit, tuned to a harmonic of the frequency at which said oscillator portion is adapted to oscillate, connected between the cathode and a point of constant potential, an intermediate frequency output circuit, means for coupling said source and said intermediate frequency output circuit to the diode anode.

3. A frequency changing system as claimed in claim 2, in which the oscillations are generated by means of a quartz crystal coupled to said oscillator portion.

4. A frequency changing system as claimed in claim 2, in which said oscillator valve or oscillator portion comprises a pentode.

5. A frequency changing system as claimed in claim 2, in which the tuned intermediate frequency output circuit comprises an inductance connected directly to the diode anode and a condenser connected between the diode anode and the high potential side of the signal input circuit.

6. A frequency changing system as in claim 2, in which bias voltage for the diode is developed by rectification of the oscillator voltage applied to it at the cathode.

7. An arrangement for deriving intermediate frequency waves from a source of input waves comprising a first electron discharge device having a cathode electrode, means for sustaining oscillations in said device at a given frequency, a diode comprising a cathode and anode electrode, a circuit tuned to a harmonic of said given frequency and comprising the common cathode circuit of each of said devices, whereby rectified harmonic waves are obtained at said anode electrode, means for coupling said input wave source to said anode electrode for mixing with said rectified harmonic waves to produce said intermediate frequency waves, an output circuit coupled to said anode electrode for extracting said intermediate frequency waves.

8. An arrangement according to claim 7 wherein said device comprises an anode electrode and a plurality of intermediate control electrodes and said means for sustaining oscillations comprises a circuit tuned to said given frequency and coupled between said anode electrode and a control electrode, a source of direct voltage and means for applying said direct voltage between said anode electrode and through said harmonically tuned circuit to the cathode electrode.

9. An arrangement according to claim 8, wherein said output circuit comprises a circuit tuned to said intermediate frequency.

CHARLES WILLIAM EARP.

REFERENCES CITED

The following references are of record in the file of this patent:

UNITED STATES PATENTS

| Number | Name | Date |
|---|---|---|
| 2,059,601 | Peterson et al. | Nov. 3, 1936 |